United States Patent
Kohlpaintner et al.

[11] Patent Number: 6,135,544
[45] Date of Patent: Oct. 24, 2000

[54] MOTOR VEHICLE ROOF WITH SLIDING COVER AND WIND DEFLECTOR

[75] Inventors: Georg Kohlpaintner, Martinsried; Thomas Staltmayer, Gauting; Engelbert Hirschvogel, Hofstetten; Günther Schwanitz, Weilheim, all of Germany

[73] Assignee: Webasto Karosseriesysteme GmbH, Stockdorf, Germany

[21] Appl. No.: 09/307,565

[22] Filed: May 10, 1999

[30] Foreign Application Priority Data

May 8, 1998 [DE] Germany .......................... 198 20 573

[51] Int. Cl.[7] ....................................................... B60J 7/22
[52] U.S. Cl. ................................................................ 296/217
[58] Field of Search ................................................ 296/217

[56] References Cited

U.S. PATENT DOCUMENTS

| | | |
|---|---|---|
| 3,711,150 | 1/1973 | Perks . |
| 4,142,759 | 3/1979 | Bienert ................... 296/217 |
| 4,362,332 | 12/1982 | Garnham ................. 296/217 |
| 4,746,165 | 5/1988 | Fuerst et al. . |
| 4,749,227 | 6/1988 | Bienert et al. ........... 296/221 |
| 4,971,387 | 11/1990 | Bohm et al. ............. 296/217 |
| 5,018,782 | 5/1991 | Fiegel et al. ............ 296/217 |
| 5,660,429 | 8/1997 | Wienchol ................. 296/217 |

FOREIGN PATENT DOCUMENTS

| | | |
|---|---|---|
| 1 189 393 | 11/1965 | Germany . |
| 39 08 750 | 6/1990 | Germany . |
| 44 44 630 | 2/1996 | Germany . |

*Primary Examiner*—Dennis H. Pedder
*Attorney, Agent, or Firm*—Nixon Peabody LLP; David S. Safran

[57] ABSTRACT

Motor vehicle roof with at least one roof opening (11) which can be selectively closed or at least partially exposed by means of an sliding cover (12) which can be displaced by a cover A drive (20), and with a wind deflector (14) which is located along the front edge (13) of the roof opening and which can be operated by a wind deflector actuating mechanism (23) depending on the movements of the sliding cover or the cover drive, between a working position with the roof (10) at least partially opened and a rest position with the roof closed. To suppress wind deflector whistling noises, the wind deflector actuating mechanism is coupled to the cover drive or the sliding cover itself such that, when the roof is opened, the wind deflector is raised into the working position on a delayed basis, after the sliding cover is first moved a predetermined distance (S) in the opening direction.

14 Claims, 4 Drawing Sheets

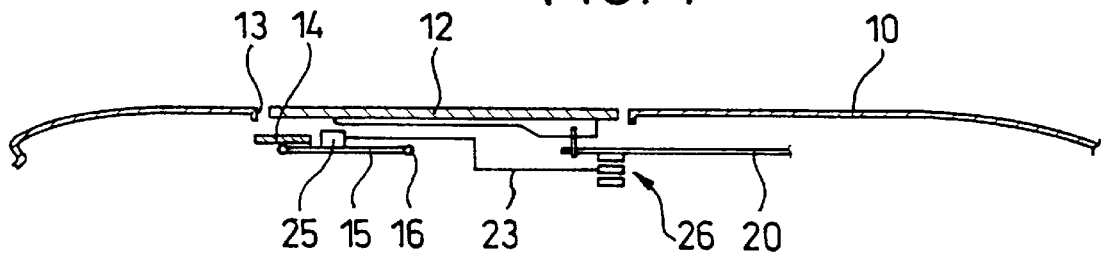
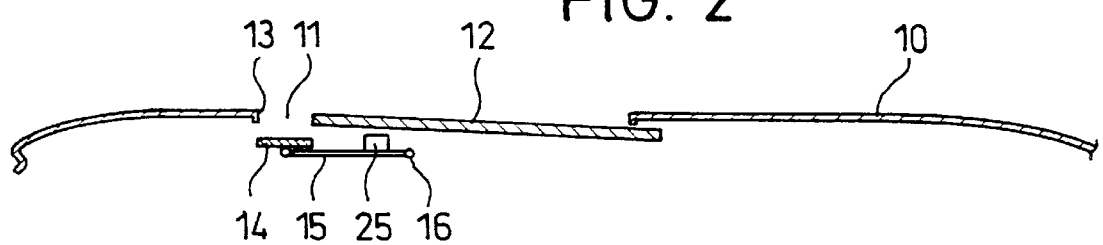
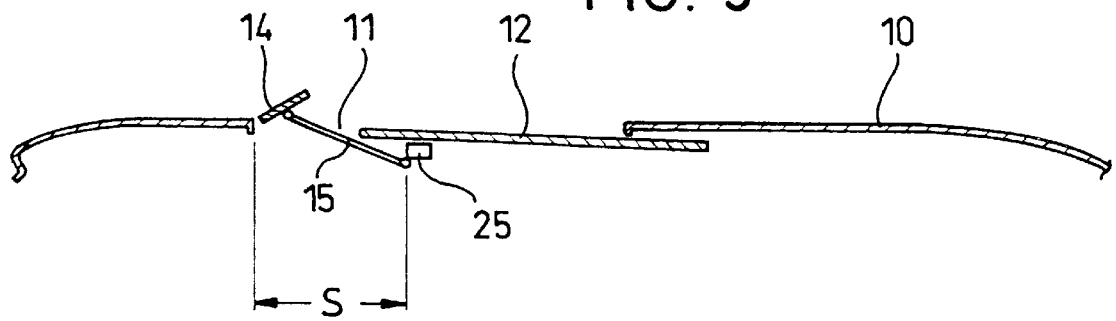

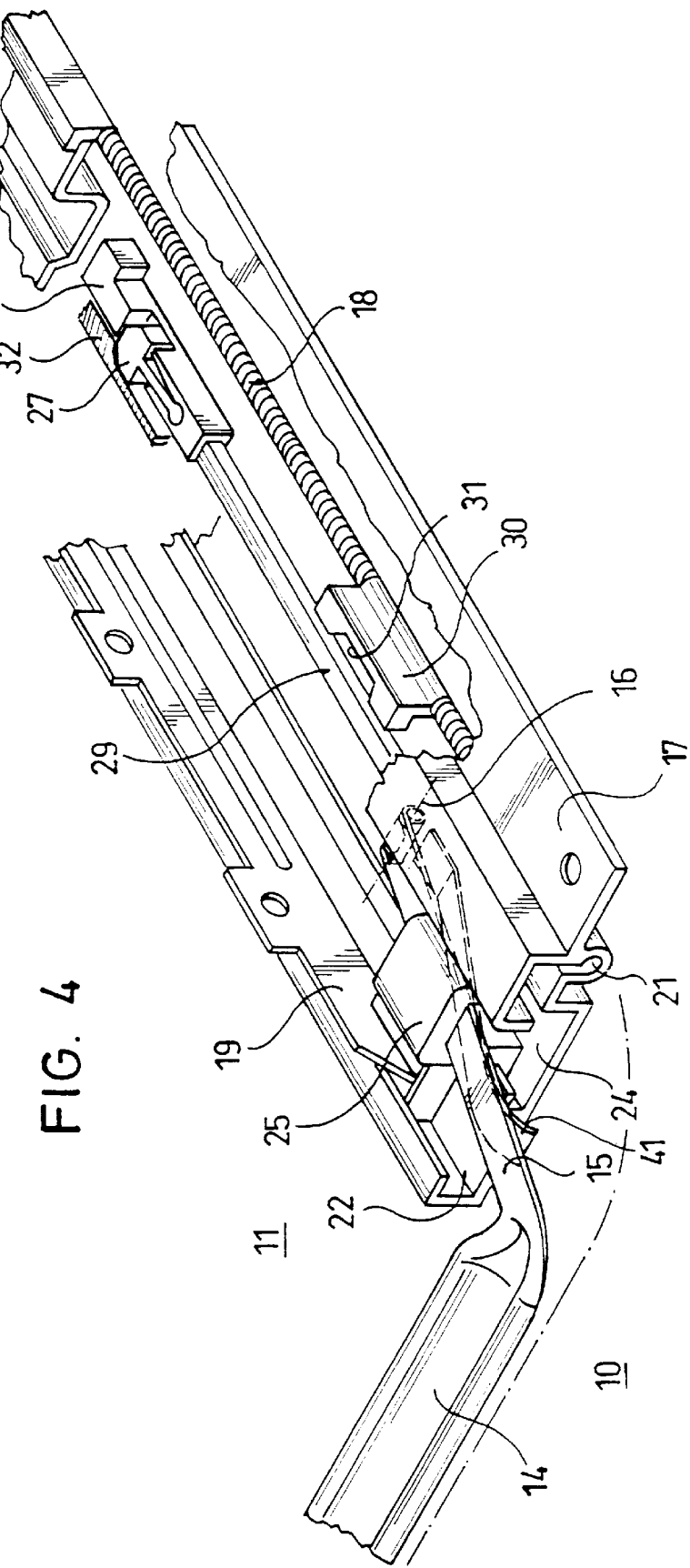

MOTOR VEHICLE ROOF WITH SLIDING COVER AND WIND DEFLECTOR

BACKGROUND OF THE INVENTION

1. Field of the Invention

The invention relates to a motor vehicle roof with at least one roof opening which can be selectively closed or at least partially exposed by means of an sliding cover which can be displaced by means of a cover drive, and with a wind deflector which is located along the front edge of the roof opening and which can be operated by means of a wind deflector actuator mechanism depending on the movements of the sliding cover or the cover drive between a working position with the roof at least partially opened and a rest position with the roof closed.

2. Description of Related Art

Motor vehicle roofs of this type are known, among others, from U.S. Pat. No. 3,711,150 and German Patent Nos. 1 189 393, DE 44 44 630 C and DE 39 08 750 C. In the known motor vehicle roofs, the wind deflector adjustment mechanism and the sliding cover or the cover drive are dynamically interconnected such that the wind deflector, at the start of the opening motion of the sliding cover is raised from the closed position in the direction to the open position into the wind deflector working position. In practice, it has been found that in many roof forms and at higher vehicle speed, whistling noise caused by the wind can occur. This applies especially when the wind deflector is equipped in the conventional manner with so-called antirumble notches (see, for example, U.S. Pat. No. 5,660,429).

SUMMARY OF THE INVENTION

The primary object of the invention is to devise a motor vehicle roof of the initially mentioned type in which disturbing wind deflector noise is prevented or at least reduced.

This object is achieved as in accordance with the present invention by a motor vehicle roof with the initially mentioned features having the wind deflector adjustment mechanism coupled to the cover drive or the sliding cover itself such that, when the roof is opened, the wind deflector is raised on a delayed basis into the working position, after the sliding cover is first moved in the opening direction to a predetermined extent, which is at least preferably 100 mm.

The invention is based on the finding that the described disturbing whistling noise can be largely or completely prevented by delayed raising of the wind deflector, i.e. when the wind deflector is first raised, until the sliding cover has already been pushed relatively far to the rear. The distance that the sliding cover is displaced in the direction of opening before raising the wind deflector depends on many factors, especially on the respective shape of the roof and the configuration of the wind deflector itself. Generally, the delay distance is in the range from 150 to 400 mm. For common roof and wind deflector shapes, a path of 250 to 350 mm has proven especially effective.

The wind deflector adjustment mechanism can be built relatively simply when the wind deflector is elastically prestressed in the direction toward its working position and can be moved into its rest position depending on the movements of the sliding cover against spring force by means of the wind deflector operating mechanism. One especially stable structure is obtained in the case in which the wind deflector is joined on each side to a respective lever arm which is supported on a side roof frame part for movement around a roof-mounted axle which extends transversely to the longitudinal axis of the motor vehicle, the lever arms being swung out into their working position by spring force when the sliding roof is opened with entrainment of the wind deflector, and when the sliding roof is closed, the lever arms can be swung back into the rest position by a sliding jaw, which can be adjusted, depending on the cover closing motion, in the longitudinal direction of the lever arm, running onto the lever arm with entrainment of the wind deflector.

For the delayed raising of the wind deflector according to the invention, when the roof is opened, in another embodiment, provisions can be made for the sliding jaw with the sliding cover or the cover drive being dynamically connected to a free travel coupling such that the sliding jaw releases the respective lever arm for a swinging-out motion when the sliding cover is opened only after the cover drive has moved the sliding cover the predetermined distance in the opening direction.

The wind deflector adjustment mechanism becomes especially durable and reliable when the sliding jaw is made as a carriage which can be movably guided along a guideway of the lateral roof frame part and which is preferably connected to a clutch element which forms a part of the free travel coupling and which engages either the cover drive or a roof-mounted component depending on the respective cover position. In this case, the cover drive advantageously has a drive cable which is guided to be able to move lengthwise to either side of the roof opening in the lateral roof frame parts and to which a respective first opposite coupling element is attached, the roof-mounted component being provided with a second opposite coupling element, and the clutch element being kept engaged with the first or second opposite coupling element depending on the cover position.

The structure becomes especially simple when in another embodiment of the invention if the clutch element is made as a locking block which, depending on the cover position, dips either into a locking block receiver in a carrier of the drive cable forming the first opposite coupling element or into a locking block receiver in a lateral roof frame part which forms the second opposite coupling element. Here, preferably, the locking block is elastically prestressed in a direction toward the first opposite coupling element and is made such that, during the opening motion of the cover, the locking block is entrained by the first opposite coupling element after the sliding cover has been moved by the predetermined distance in the opening direction while, in a cover closing motion, the locking block leaves the locking block receiver of the first opposite coupling element as a result of the force components derived from the cover drive force and is inserted into the locking block receiver of the side roof frame part.

The carriage can be connected to the clutch element especially via a coupling rod which extends rearwardly from the carriage and which has a longitudinal dimension which determines the predetermined distance.

These and further objects, features and advantages of the present invention will become apparent from the following description when taken in connection with the accompanying drawings which, for purposes of illustration only, show several embodiments in accordance with the present invention.

BRIEF DESCRIPTION OF THE DRAWINGS

FIGS. 1 to 3 are schematic longitudinal roof sections for different phases of motion of the sliding cover and the wind deflector; and FIGS. 4 to 6 each show perspective view of the interacting parts of the wind deflector adjustment mechanism and the cover drive in the positions corresponding to those of FIGS. 1, 2 and 3, respectively.

DETAILED DESCRIPTION OF THE INVENTION

The motor vehicle roof 10 shown schematically in FIGS. 1 to 3 has a roof opening 11 which can be selectively closed or at least partially exposed by means of the sliding cover 12. FIGS. 1 to 3 show the sliding cover 12 as part of a simple sliding roof. But it goes without saying that the motor vehicle roof can also be designed differently, especially as a sliding/lifting roof, spoiler roof, multi-cover roof and the like.

Figure 5:
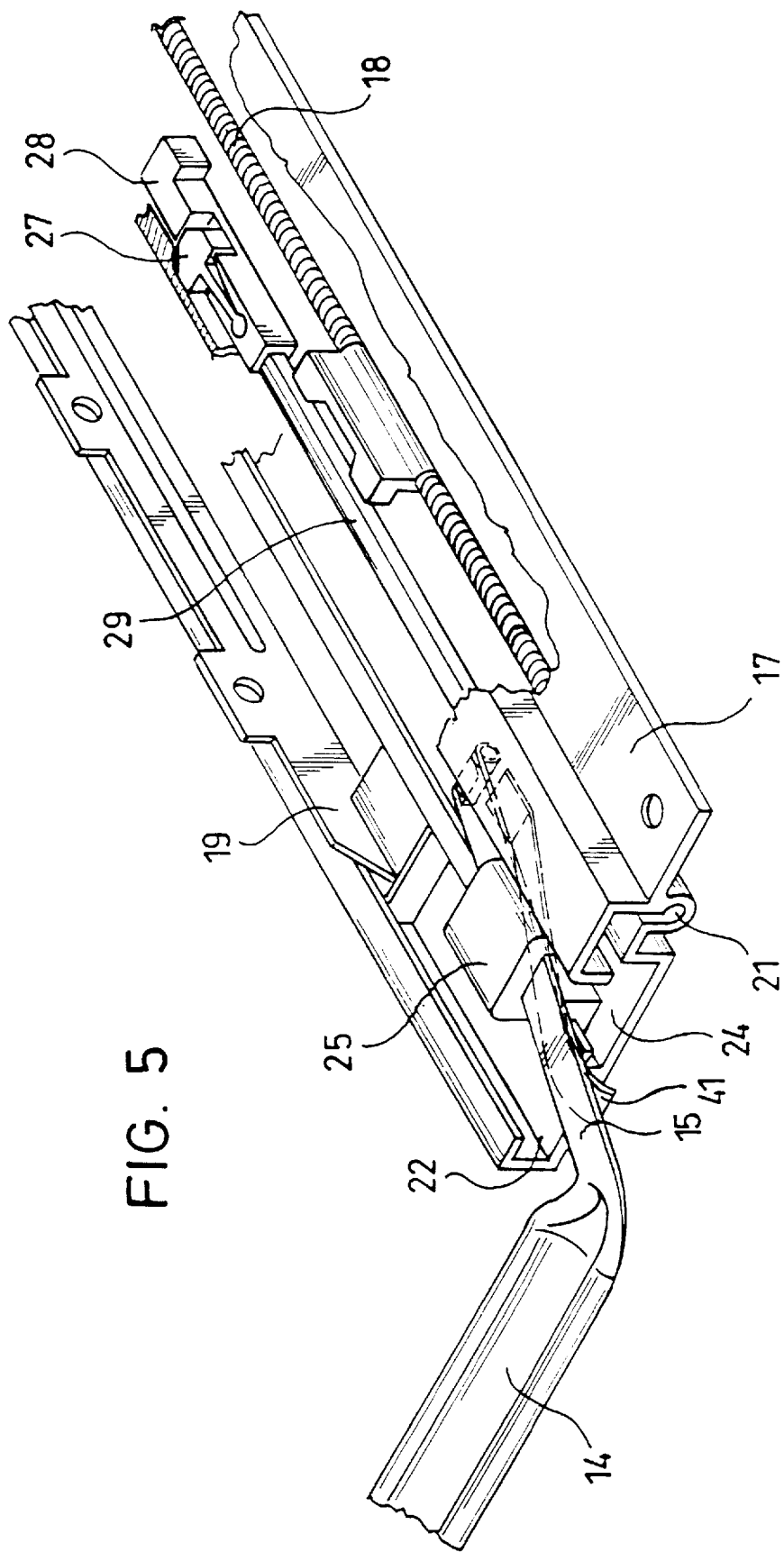
Figure 6:
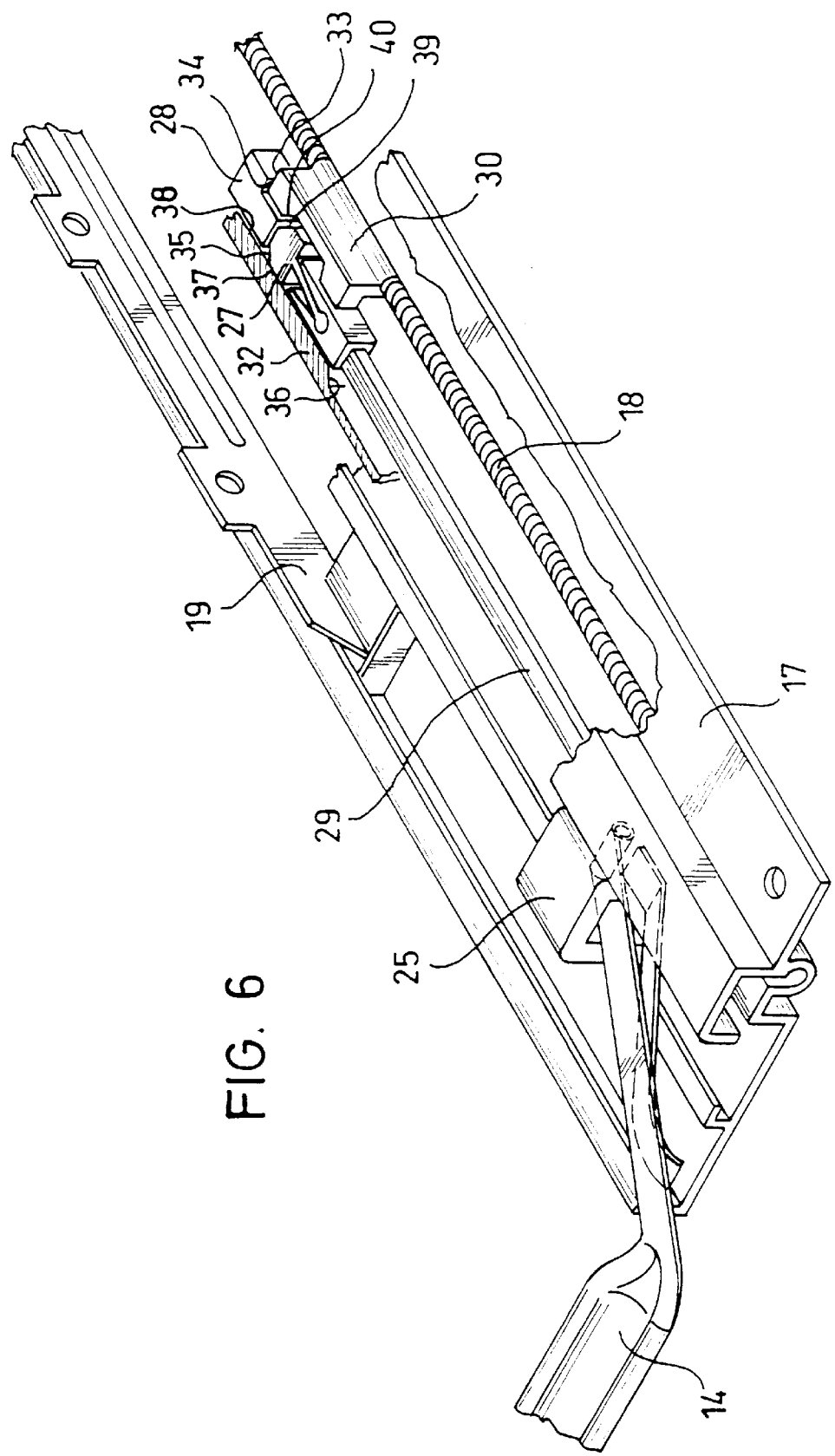

Along the front edge 13 of the roof opening 11 there is a wind deflector 14 which, as follows in particular from FIGS. 4–6, is connected on each side to a respective lever arm 15. Each of the lever arms is supported on a side roof frame part 17 to pivot around a roof-mounted axle 16 which extends transversely to the longitudinal axis of the motor vehicle.

To displace the sliding cover 12, there is a cover drive which includes a compressively 15 rigid drive cable 18 and carriage/crank arrangements 19 which sit on either side of the cover. These cover drives are common and therefore do not require further explanation here. For example, the cover dive can be made identical or similar to the cover drives which are explained in detail, for example, in U.S. Pat. Nos. 4,749,227 and 4,746,165. This cover drive is labeled 20 in FIG. 1. The drive cable 18 is guided to move lengthwise in a cable channel 21 of the roof frame part 17. A guide channel 22 of the roof frame part 17 is used as the longitudinal guide of the carriage-crank arrangement.

A wind deflector 14 is elastically prestressed by a 41 in the direction toward its working position, which is shown in FIG. 3. A wind deflector operating mechanism 23 is designed such that it moves the wind deflector 14, depending on the movement of the sliding cover 12, against force of spring 41 into its rest position. The wind deflector 14 is shown in FIGS. 1 & 2 in its rest position. The wind deflector operating mechanism 23 includes a sliding jaw which is made as an carriage 25 which is guided to move along a guideway 24 of the lateral roof frame part 17. When the sliding cover 12 is being closed, this carriage 25 runs in the manner shown in FIGS. 1, 2, 4 and 5 onto the lever aim 15 in order to swing the lever arm 15, and with it, the wind deflector 14, into its rest position. The carriage 25, in the embodiment shown, is dynamically connected to the cover drive 20 via a free motion coupling labeled 26 in FIG. 1, such that the carriage 25 releases the associated lever arm 15 for a swinging-out motion when the sliding cover 12 is opened, only after the cover drive 20 has moved the sliding cover 12 by a predetermined distance in the opening direction, which is labeled S in FIG. 3.

The free motion coupling 26 includes a clutch element in the form of a locking block 27 which sits with a swivelling capacity in a locking block bearing 28 which is connected to the carriage 25 via a coupling rod 29 which extends to the rear from the carriage 25. The longitudinal dimension of the coupling rod 29 determines the distance S. A carrier 30 is attached to the drive cable 18 with a locking block receiver 31, while another locking block receiver 32 is formed in the roof-mounted, roof frame part 17. The carrier 30 with the locking block receiver 31 forms a first opposite coupling element, while the roof frame part 17 with its locking block receiver 32 represents a second opposite coupling element.

The locking block 27, depending on the position of the sliding cover 12, dips either into the locking block receiver 31 of the carrier 30 (FIG. 6) or into the locking block receiver 32 of the roof frame part 17 (FIGS. 4 and 5).

When the roof is closed (FIGS. 1 & 4), the coupling between the cover drive 20 and the wind deflector adjustment mechanism 23 is disengaged. The locking block 27 which is pivotally mounted in the locking block bearing 28 dips into the locking block receiver 32 of the roof frame part 17, by which the carriage 25 is locked in the position in which it keeps the wind deflector 14 in the rest position. This state is maintained when the sliding cover 12 is initially pushed back in the opening direction (FIGS. 2 & 5). However, when the cover has traversed the predetermined path S in the direction of opening, the rear face of the carrier 30 abuts a shoulder 34 of the locking block bearing 28 which points forward (FIG. 6), by which the locking block bearing 28, together with the coupling rod 29 and carriage 25, is entrained to the rear by the drive cable 18, so that the carriage 25 releases the lever arm 15 for a swinging-out motion. The wind deflector 4 is moved into its working position by spring force. An oblique surface 35 of the locking block 27 adjoins the opposite surface 36 of the locking block receiver 32. In doing so, a force component is derived from the cover drive force which swivels the locking block 27 out of the locking block receiver 32 and moves into the locking block receiver 31 of the carrier 30. As the cover 12 continues to move rearward, the coupling between the cover drive 20 and the wind deflector adjustment mechanism 23 is maintained.

Conversely, if the sliding cover 12, proceeding from the open position, is pushed in the direction toward its closed position, first, the carriage 25 remains coupled via the coupling rod 29, the locking block bearing 28 and the locking block 27 to the carrier 30 attached to the drive cable 18, because the locking block 27 is kept engaged to the locking block receiver 31 of the carrier 39 by its lateral surface 37 abutting the guide surface 38 of the roof frame part 17. However, when the sliding cover 12 has closed to the distance S from the closed position, the locking block 27 is opposite the locking block receiver 32. At this point, the interaction between the oblique surface 39 of the locking block 27 and the opposite surface 40 of the carrier 30 causes the locking block 27 to swivel relative to the locking block bearing 28, leaving the locking block receiver 31 and moving into the locking block receiver 32. This cancels the coupling between the cover drive 20 and the wind deflector adjustment mechanism 23. The carriage 25 in the course of movement has swung the wind deflector 14 via the lever arm 15 back down into the rest position. The cover 12 can be moved into the fully closed position while the wind deflector adjustment mechanism is locked with reference to the roof frame part 17.

It goes without saying that the free travel coupling can be implemented differently, for example, as a magnetic coupling which is controlled according to the described motion.

While various embodiments in accordance with the present invention have been described and a single embodiment shown, it is understood that the invention is not limited thereto, and is susceptible to numerous changes and modifications as known to those skilled in the art. Therefore, this invention is not limited to the details shown and described herein, and includes all such changes and modifications as are encompassed by the scope of the appended claims.

We claim:

1. Motor vehicle roof with at least one roof opening in a fixed roof surface, a sliding cover with which the roof opening is selectively closed and at least partially exposed, a cover drive for displacing the sliding cover, and with a wind deflector which is located along a front edge of the roof opening, a wind deflector operating mechanism for displacing the wind deflector between a lowered rest position when the roof opening is closed and a raised working position when the roof opening is at least partially open; wherein the wind deflector operating mechanism is coupled to one of the cover drive and the sliding cover by a free travel coupling such that, when the roof is opened, the wild deflector is raised into said working position on a delayed basis after the sliding cover is first moved a predetermined distance from the closed position in an opening direction; wherein the wind deflector is elastically prestressed in a direction toward said working position and is displaced into said rest position against spring force by means of the wind deflector operating mechanism; and wherein a sliding jaw is dynamically connected via the free travel coupling to the cover drive such that the sliding jaw releases the respective lever arm when the cover drive has moved the sliding cover said predetermined distance in the opening direction.

2. Motor vehicle roof as claimed in claim 1, wherein said predetermined distance is at least 100 mm.

3. Motor vehicle roof as claimed in claim 1, wherein the wind deflector is joined to a respective lever arm at each end, the lever aim being supported on a side roof frame part to pivot around a roof-mounted axle which extends transversely to a longitudinal axis of the vehicle roof, the lever arm being swung-out by spring force when the sliding roof is opened with entrainment of the wind deflector, and being swung-in when the sliding roof is closed by the sliding jaw which is displaced in the longitudinal direction of the lever arm, running onto the lever arm with entrainment of the wind deflector.

4. Motor vehicle roof as claimed in claim 1, wherein the sliding jaw is a carriage which is movably guided along a guideway of a lateral roof frame part.

5. Motor vehicle roof as claimed in claim 4, wherein the carriage is connected to a clutch element which forms a part of the free travel coupling and which engages either the cover drive or a roof-mounted component depending on the position of the cover.

6. Motor vehicle roof as claimed in claim 5, wherein the cover drive has a drive cable which is guided to move lengthwise in the lateral roof frame part at each side of the roof opening and to which a first opposite coupling element is attached; wherein the roof-mounted component is provided with a second opposite coupling element; and wherein the clutch element is engaged with the first or second opposite coupling element depending on the cover position.

7. Motor vehicle roof as claimed in claim 6, wherein the clutch element is a locking block which, depending on the cover position, dips either into a locking block receiver in a carrier of the drive cable forming the first opposite coupling element or into a locking block receiver in a lateral roof frame part which forms the second opposite coupling element.

8. Motor vehicle roof as claimed in claim 6, wherein the locking block is made such that, during the opening motion of the sliding cover, the locking block is entrained by the first opposite coupling element after the sliding cover has been moved said predetermined distance in the opening direction, while in a cover closing motion the locking block leaves the locking block receiver of the first opposite coupling element as a result of the force components derived from the cover drive force and is inserted into the locking block receiver of the side roof frame part.

9. Motor vehicle roof as claimed in claim 8, wherein the carriage is connected to the clutch element via a coupling rod which extends rearwardly from the carriage and which has a length which determines said predetermined distance.

10. Motor vehicle roof as claimed in claim 5, wherein the carriage is connected to the clutch element via a coupling rod which extends rearwardly from the carriage and which has a length which determines said predetermined distance.

11. Motor vehicle roof as claimed in claim 10, wherein the predetermined distance is in a range from 150 to 400 mm.

12. Motor vehicle roof as claimed in claim 10, wherein the predetermined distance is in a range 250 to 350 mm.

13. Motor vehicle roof as claimed in claim 1, wherein the predetermined distance is in a range from 150 to 400 mm.

14. Motor vehicle roof as claimed in claim 1, wherein the predetermined distance is in a range 250 to 350 mm.

* * * * *